(12) United States Patent
Duan et al.

(10) Patent No.: US 10,001,199 B2
(45) Date of Patent: Jun. 19, 2018

(54) CONTINUOUSLY VARIABLE TRANSMISSION AND METHOD FOR CONTROLLING THE SAME

(71) Applicant: GM GLOBAL TECHNOLOGY OPERATIONS LLC, Detroit, MI (US)

(72) Inventors: Chengwu Duan, Shangahi (CN); Ying Huang, Shanghai (CN)

(73) Assignee: GM Global Technology Operations LLC, Detroit, MI (US)

( * ) Notice: Subject to any disclaimer, the term of this patent is extended or adjusted under 35 U.S.C. 154(b) by 0 days. days.

(21) Appl. No.: 15/557,612

(22) PCT Filed: Mar. 18, 2015

(86) PCT No.: PCT/CN2015/074456
§ 371 (c)(1),
(2) Date: Sep. 12, 2017

(87) PCT Pub. No.: WO2016/145627
PCT Pub. Date: Sep. 22, 2016

(65) Prior Publication Data
US 2018/0094710 A1 Apr. 5, 2018

(51) Int. Cl.
*F16H 9/12* (2006.01)
*F16H 61/662* (2006.01)

(52) U.S. Cl.
CPC ........ *F16H 9/125* (2013.01); *F16H 61/66272* (2013.01); *F16H 2061/66277* (2013.01)

(58) Field of Classification Search
None
See application file for complete search history.

(56) References Cited

U.S. PATENT DOCUMENTS 4,909,776 A * 3/1990 Sakakibara ........... F16H 37/022
474/11
5,094,652 A * 3/1992 Sakakibara ........... F16H 37/022
474/46

(Continued)

FOREIGN PATENT DOCUMENTS

CN 101089428 A 12/2007
CN 101349609 A 1/2009
(Continued)

OTHER PUBLICATIONS

International Search Report on International Application No. PCT/CN2015/074456, dated Dec. 28, 2015, 12 pages.

*Primary Examiner* — Colby M Hansen
(74) *Attorney, Agent, or Firm* — Quinn IP Law

(57) ABSTRACT

A continuously variable transmission (CVT) (14) includes a drive pulley (18), a driven pulley (20), and an endless rotatable device (22) coupled between the drive and driven pulleys (18, 20). The drive pulley (18) and the driven pulley (20) each include pulley teeth (19T, 21T), and the endless rotatable device (22) includes device teeth (22T). A controller (50) can control the operation of the CVT and can execute the following instructions: (a) receiving a torque request while the device teeth (22T) are mating with the pulley teeth (19T, 21T); (b) determining whether the torque request direction is opposite to the input torque direction; (c) determining whether a current clamping force applied by an actuator (28, 30) to the drive pulley (18) is sufficient to change the direction of the torque transmitted by the drive pulley (18); and (d) commanding the actuator (28; 30) to increase the current clamping force when the current clamping force is not sufficient to change the direction of the torque transmitted by the drive pulley (18).

20 Claims, 3 Drawing Sheets

(56) References Cited

U.S. PATENT DOCUMENTS 5,674,150 A * 10/1997 Morishita ............... F16H 61/16
                                                    192/3.63
5,888,168 A *  3/1999 Niiyama ........... F16H 61/66259
                                                    474/28
6,290,620 B1   9/2001 Tsai et al.

FOREIGN PATENT DOCUMENTS

| CN | 101561043 A | 10/2009 |
| CN | 102414488 A | 11/2012 |
| CN | 103244611 A | 8/2013 |
| JP | 11325207 A | 11/1999 |
| JP | 2005233280 A | 2/2005 |

* cited by examiner

CONTINUOUSLY VARIABLE TRANSMISSION AND METHOD FOR CONTROLLING THE SAME

TECHNICAL FIELD

The present disclosure relates to a continuously variable transmission (CVT) and a method for controlling the same.

BACKGROUND

A CVT is a power transmission providing infinite variability of speed ratios within a calibrated range. That is, while conventionally-geared transmissions typically use planetary gear sets and multiple rotating and/or braking clutches to establish a desired speed ratio, a CVT instead uses a variator assembly with a pair of variable-diameter pulleys to transition anywhere within the calibrated range of speed ratios.

SUMMARY

The present disclosure describes a CVT including a drive pulley, a driven pulley, and an endless rotatable device (e.g., chain) coupled between the drive pulley and the driven pulley. The drive pulley and the driven pulley each include pulley teeth, and the endless rotatable device includes device teeth configured to mate with the pulley teeth. The presently disclosed CVT can operate in a friction drive mode and a fixed gear/positive engagement mode. In the friction drive mode, the CVT relies on the friction between the endless rotatable device and drive and driven pulleys to transmit torque. In the fixed gear/positive engagement mode, at least some of the pulley teeth mate with the device teeth in order to transmit torque.

When operating in the fixed gear/positive engagement mode, the CVT may experience an impact during a torque direction reversal due to the lash between the two transmission components (i.e., the lash-induced impact). In the present disclosure, the term "lash" means the amount of free motion between two components (e.g., gear teeth). The present disclosure describes a method for minimizing the lash-induced impact in the CVT during a torque direction reversal.

In an embodiment, the CVT can operate according to a method suitable to minimize the lash-induced impact during a torque direction reversal. In one embodiment, the method includes the following steps: (a) receiving, via a controller, a torque request while the drive pulley of the CVT transmits torque in an input torque direction and the device teeth are mating with the pulley teeth, wherein the torque request includes a torque request magnitude and a torque request direction; (b) determining, via the controller, whether the torque request direction is opposite to the input torque direction; (c) determining, via the controller, whether a current clamping force applied by an actuator to the drive pulley is sufficient to change a direction of a torque transmitted by the drive pulley from the input torque direction to the torque request direction when the torque request direction is opposite to the input torque direction; and (d) commanding, via the controller, the actuator to increase the clamping force applied to the drive pulley when the current clamping force is not sufficient to change the direction of the torque transmitted by the drive pulley from the input torque direction to the torque request direction. The present disclosure also describes CVT assemblies and vehicles including a CVT capable of operating according to the method described above.

The above features and advantages and other features and advantages of the present disclosure are readily apparent from the following detailed description when taken in connection with the accompanying drawings.

DETAILED DESCRIPTION

Figure 1:
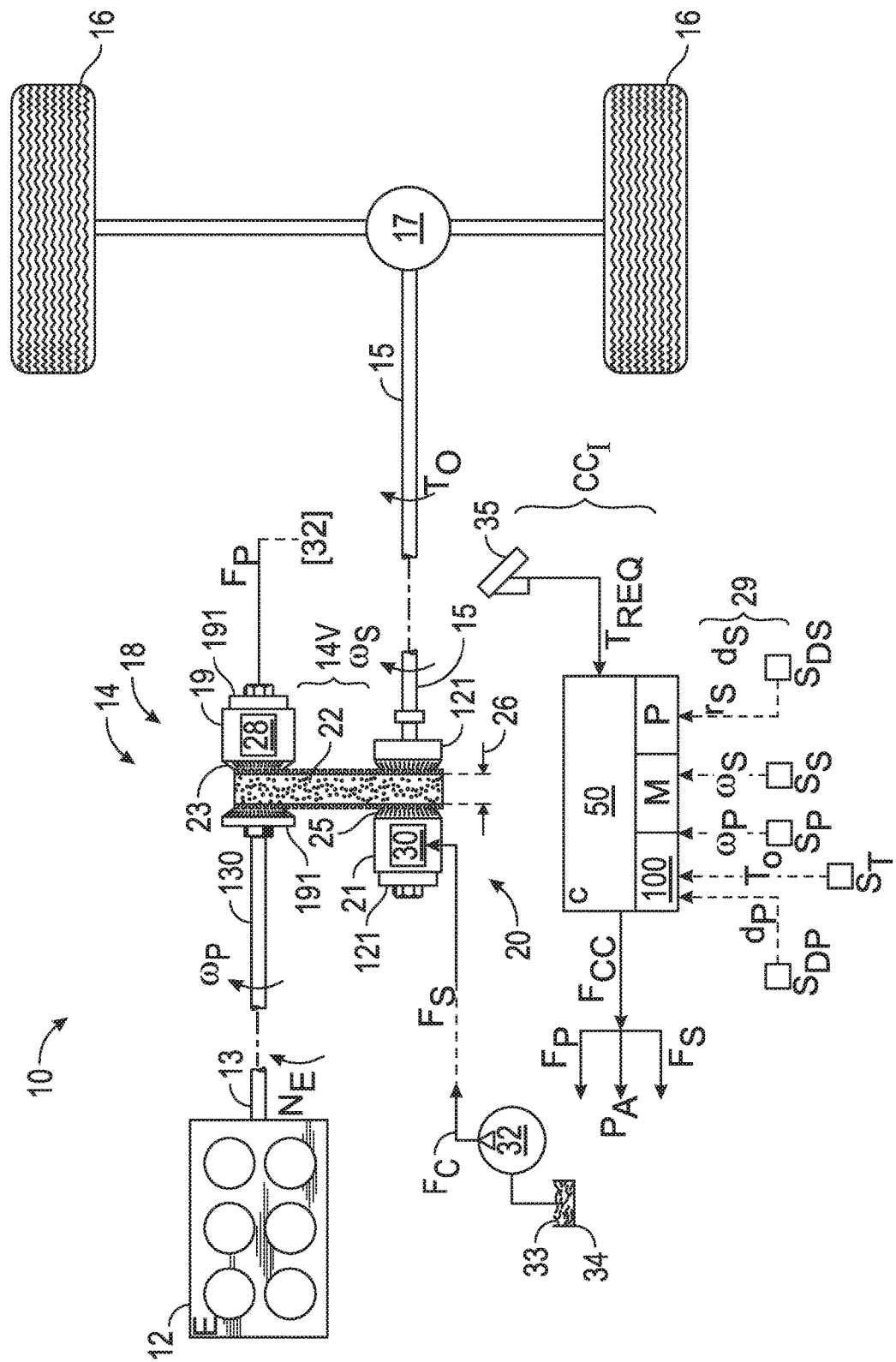
FIG. 1 is a schematic illustration of an example vehicle having an internal combustion engine and a fixed gear/positive engagement continuously variable transmission (CVT) controlled as set forth herein.

Referring to the drawings, wherein like reference numbers correspond to like or similar components throughout the several figures, an example vehicle 10 is shown schematically in FIG. 1. The vehicle 10 includes a power plant 12, which is shown as an example internal combustion engine (E) but which may be alternatively embodied as an electric machine or other suitable torque generating device. For illustrative consistency, the power plant 12 is described in this disclosure as being an engine 12 without being limited to such a design.

Figure 2:
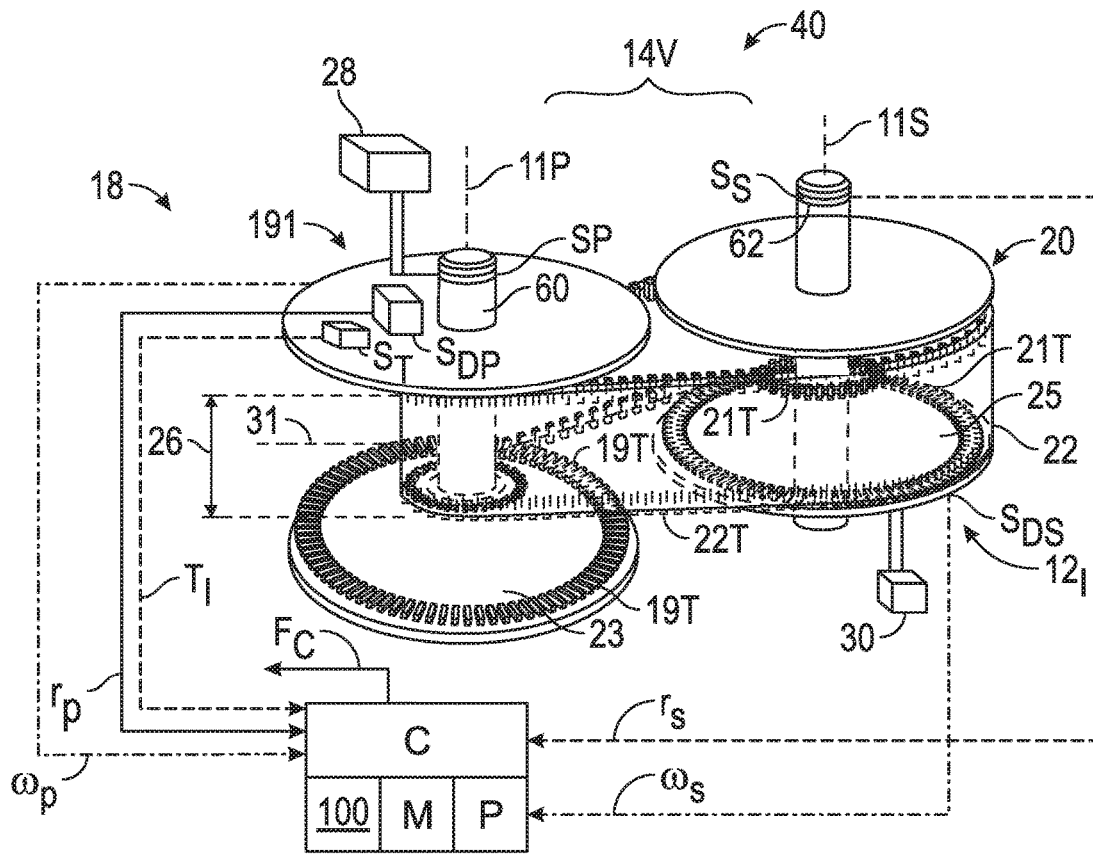
FIG. 2 is a schematic illustration of an example fixed gear/positive engagement CVT usable as part of the vehicle shown in FIG. 1 and controllable via the method of FIG. 5.

With reference to FIGS. 1 and 2, the vehicle 10 of FIG. 1 includes a fixed gear/positive engagement continuously variable transmission (CVT) 14 and an associated controller (C) 50. As set forth below in further detail with reference to FIGS. 2 and 5, the controller 50 is configured (i.e., specially programmed in software via computer-readable and implementable instructions embodying a method 100 and sufficiently equipped in hardware) to control a mode transition between the two possible torque transfer modes of the CVT 14 (i.e., a friction drive mode and a fixed gear/positive engagement drive mode).

In the CVT 14, the friction drive mode provides infinite variability of speed ratios between a lowest and highest possible speed ratio. Such infinite variability continues up until positive engagement is achieved, whereupon a fixed gear ratio is sustained until control conditions warrant a change back to the friction drive mode. The enhancement of the CVT 14 with positive engagement functionality can increase variator efficiency due to a reduced reliance on the hydraulic and/or electromechanical clamping forces ordinarily needed to maintain the friction drive mode.

The engine 12 includes a crankshaft 13 configured to rotate at an engine speed ($N_E$). The crankshaft 13 is connected to an input member 130 (e.g., input shaft) of the CVT 14, either directly or indirectly (e.g., via a torque converter or an input/disconnect clutch) depending on the design. The CVT 14 also includes an output member 15 (e.g., output shaft). The output member 15 ultimately delivers transmission output torque ($T_O$) to a set of drive wheels 16 of the vehicle 10 via, by way of example, a final drive or a differential 17.

The CVT 14 includes a variator assembly 14V having a drive/primary pulley 18 and a driven/secondary pulley 20. The primary pulley 18 is connected to and driven by the input member 130 of the CVT 14. The secondary pulley 20 is connected to and drives an output member 15 of the CVT 14. The CVT 14 also includes an endless rotatable device 22, such as a belt or chain. As used herein, the term "endless rotatable device" refers generally to any closed/endless rotatable drive element or closed-loop of a rubber and/or metal material suitable for transmitting torque from the primary pulley 18 to the secondary pulley 20 within the variator assembly 14V, including a chain or a conventional rubber and metal drive belt. In other words, the term "endless rotatable device" is inclusive of all endless rotatable drive elements of the type usable for transferring torque between pulleys in a CVT such as the CVT 14 of FIG. 1.

Figure 3:
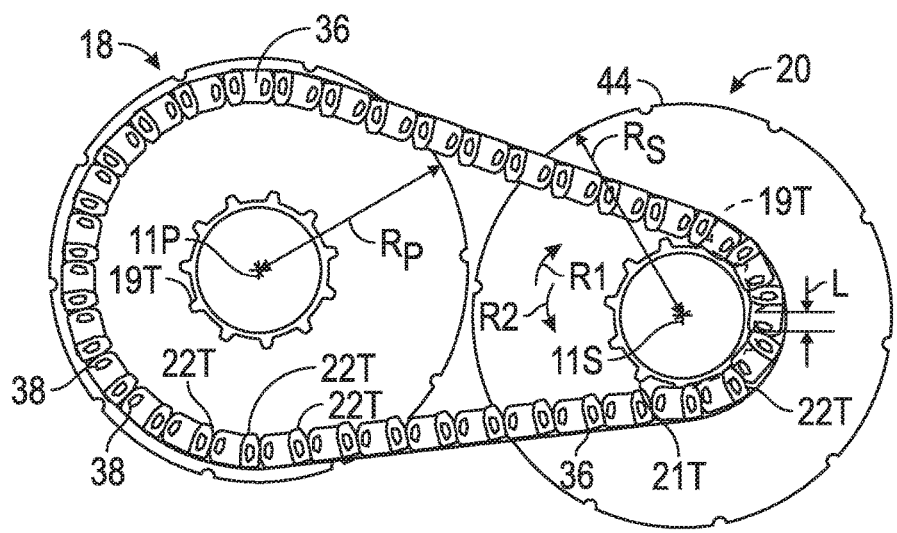
FIG. 3 is a schematic, front view of the CVT shown in FIG. 2.
Figure 4:
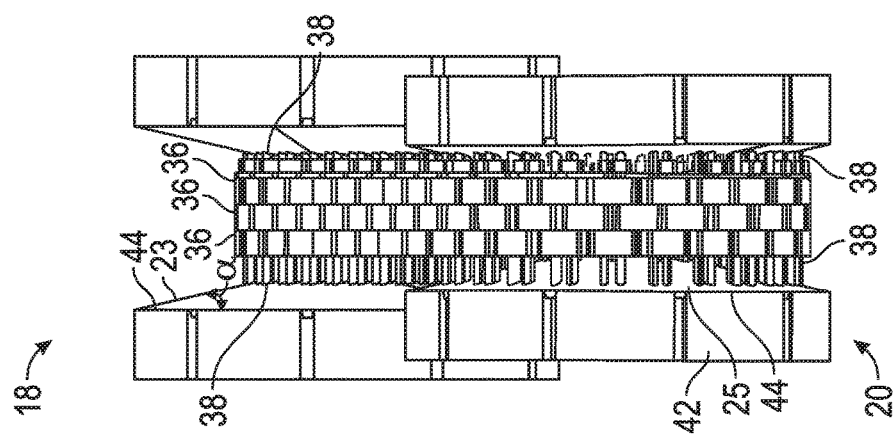
FIG. 4 is a schematic, side view of the CVT shown in FIG. 2.

With reference to FIGS. 3 and 4, the endless rotatable device 22 includes a plurality of interspaced device teeth 22T (see FIG. 2) which are used to achieve positive engagement in fixed gear modes of the CVT 14. In addition to the device teeth 22T, the endless rotatable device 22 may include a plurality of links 36, such as chain links, arranged in rows. A plurality of pins 38 interconnects the links 36 to one another. At least some of the pins 38 also couple the device teeth 22T to the links 36. When the CVT 14 operates in the friction drive mode, the pins 38 are in direct contact with the primary pulley 18 and the secondary pulley 20.

With reference again to FIGS. 1-4, the respective primary and secondary pulleys 18 and 20 each have a pair of pulley sheaves 19 and 21, respectively, each with a respective conical sheave face 23 or 25 defining a variable-width gap 26. The endless rotatable device 22 of the CVT 14 is positioned within the gap 26 and contacts the sheave faces 23 and 25. In the depicted embodiment, the pins 38 (FIG. 4) of the endless rotatable device 22 directly contact the sheave faces 23 and 25 at least when the CVT 14 is operating in the friction drive mode. In the depicted embodiment, engine speed ($N_E$) acts as an input speed ($\omega_P$) to the primary pulley 18. In other embodiments, another value other than the engine speed ($N_E$) may serve as the input speed ($\omega_P$) (e.g., turbine speed when a torque converter is used downstream of the engine 12, rotor speed, etc.). The secondary pulley 20 always rotates at a secondary speed ($\omega_S$).

The width of the gap 26 may be varied via a movement of a moveable one of the pulley sheaves 19 and/or 21 of each the respective primary and secondary pulleys 18 and 20 to change the speed ratio of the CVT 14. To that end, the vehicle 10 includes respective first and second pulley actuators 28 and 30 responsive to respective primary and secondary force commands ($F_P$, $F_S$ respectively) to compress the respective primary and secondary pulleys 18 and 20, i.e., to move the pulley sheaves 19 toward each other and/or to move the pulley sheaves 21 toward each other depending on whether the width of the gap 26 on the drive or driven side of the variator assembly 14V is being modified. An example embodiment of the first and second actuators 28 and 30 includes a hydraulic piston/cylinder system, although electromechanical, pneumatic, or other linear actuators may be used in the alternative within the intended inventive scope.

Each of the pulley sheaves 19, 21 includes a lateral circumferential wall 42 and a circumferential edge 44 between each lateral circumferential wall 42 and the respective sheave face 23, 25. Each of the pulley sheaves 19, 21 defines a sheave angle α, which is an oblique angle defined between the respective sheave faces 23, 25 and the respective circumferential edge 44. The drive pulley 18 also has a radius $R_P$, and the driven pulley 20 has a radius $R_S$. The radius $R_P$ of the drive pulley 18 is a distance from the axis of rotation 11P to the circumferential edge 44 of the drive pulley 18. The radius $R_S$ of the driven pulley 20 is a distance from the axis of rotation 11S to the circumferential edge 44 of the driven pulley 18.

For each of the pulley sheaves 19 and 21, one of the pulley sheaves 19 and 21 is a moveable sheave, in this instance the pulley sheaves 191 and 121. The clamping force ($F_C$), i.e., arrows $F_P$ and/or $F_S$ depending on which of the pulley sheaves 121 and 191 is being moved, may be provided to the CVT 14 via a fluid pump 32 feeding both the primary and secondary forces ($F_P$ and $F_S$) as shown, with the fluid pump 32 drawing a suitable fluid 33 such as oil from a sump 34 and circulating the fluid 33 to the CVT 14 via hoses, fittings, and other suitable fluid conduit.

Each pulley sheave 19 and 21 of FIG. 1 is characterized by a substantially frusto-conical shape, i.e., a cone having its tip or narrow end removed. Each pulley sheave 19 and 21 further includes a respective plurality of pulley teeth 19T and 21T on its sheave faces 23, 25, as best shown in FIG. 2 and described in more detail below. The device teeth 22T, when fully mated with pulley teeth 19T and/or 21T in this embodiment, ensure that rotation of the respective primary or secondary pulleys 18 or 20 causes a rotation of the endless rotatable device to occur and vice versa.

During operation of the CVT 14, the engine 12 transmits input torque to the primary pulley 18. This causes the primary pulley 18 to rotate. As the primary pulley 18 rotates, the sheave face 23 contacts the endless rotatable device 22. For example, the pins 38 of the endless rotatable device 22 contact the sheave face 23. Friction at an interface between the sheave face 23 and the endless rotatable device 22 causes the endless rotatable device 22 to rotate. Because the endless rotatable device 22 is rotationally coupled to the secondary pulley 20, rotation of the endless rotatable device 22 in turn causes the secondary pulley 20 to rotate. While the endless rotatable device 22 rotates, the actuators 28 and/or 30 may apply force to the pulley sheaves 191 and/or 121 of the first and second pulley 18 and 19, respectively, in order to vary the speed ratio of the CVT 14. Such control decisions may be made by the controller 50.

The controller 50 used to control the operation of the CVT 14 may be configured as one or more computer devices having memory (M). The controller 50 is in communication with a plurality of sensors 29 and can command a shift or transition between the friction drive mode and the fixed gear/positive engagement drive mode of the CVT 14, via transmission of the positive engagement control signals ($P_A$) to the CVT 14, i.e., the actuators 28 and/or 30 or another actuator depending on the design.

The controller 50 may include hardware elements such as a processor (P), circuitry including but not limited to a timer, oscillator, analog-to-digital (A/D) circuitry, digital-to-analog (D/A) circuitry, a digital signal processor, and any necessary input/output (I/O) devices and other signal conditioning and/or buffer circuitry. The memory (M) may include tangible, non-transitory memory such as read only memory (ROM), e.g., magnetic, solid-state/flash, and/or optical memory, as well as sufficient amounts of random access memory (RAM), electrically-erasable programmable read-only memory (EEPROM), and the like. The method 100 may be recorded in memory (M) and executed by the processor (P) in the overall control of the vehicle 10.

The controller 50, which is in communication with the first and second actuators 28 and 30, receives a set of control inputs ($CC_I$) from the plurality of sensors 29 as part of the method 100. The sensors 29 are collectively operable for continuously or periodically measuring the input speed ($\omega_P$) of the CVT 14, the output speed ($\omega_S$) of the CVT 14, the axial linear displacements ($d_P$, $d_S$) of each of the drive and driven pulleys 18 and 20, and an input torque $T_I$ of the CVT 14. Therefore, the sensors 29 may include first and second speed sensors $S_P$ and $S_S$, first and second displacement sensors $S_{DP}$ and $S_{DS}$, and a torque sensor $S_T$. The first or primary speed sensor $S_P$ may be connected to a pulley axle 60 (FIG. 2) of the drive pulley 18. The second or secondary speed sensor $S_S$ may be connected to a pulley axle 62 of the driven pulley 20 (FIG. 2). In this embodiment, the speed sensors $S_P$ and $S_S$ directly measure the respective input speed ($\omega_P$) and output or secondary speed ($\omega_S$). The torque sensor $S_T$ may be coupled to the input member 130 of the CVT 14 or the drive pulley 18 of the CVT 14. The input speed ($\omega_P$) and the input torque $T_I$ to the CVT 14 may be measured by the speed sensor $S_P$, or it may be reported or calculated as a function of engine speed ($N_E$), e.g., from an engine control unit. The rotational output speed ($\omega_S$) of the secondary pulley 20 may be likewise measured by the speed sensor $S_S$. The displacement sensors $S_{DP}$ and $S_{DS}$ respectively measure the axial linear displacements ($d_P$, $d_S$) of a respective one of the moveable pulley sheaves 191 and 121. The input torque $T_1$ of the drive pulley 18 can be measured by the torque sensor $S_T$, or determined (e.g., calculated) by the controller 50 based, at least in part, on the input speed ($\omega_P$) of the CVT 14. The input torque $T_I$ of the CVT 14 includes an input torque magnitude $T_{IM}$ and a torque request direction $T_{RD}$. The controller 50 can determine the input torque magnitude $T_{IM}$ and the torque request direction $T_{RD}$ based on an input from the torque sensor $S_T$. Alternatively, the controller 50 can determine the input torque magnitude $T_{IM}$ and the torque request direction $T_{RD}$ based, at least in part, on an input from the speed sensors $S_P$ and/or the actions of the vehicle operator via, for example, the operator actuator 35 (e.g., an accelerator pedal).

The controller 50 can then calculate primary and secondary radii $r_P$ and $r_S$ of the belt positions on the pulleys 18 and 20 respectively, using known geometric design information of the CVT 14 such as its half angle and initial state conditions. That is, the controller 50 is aware at all times of the primary and secondary radii $r_P$ and $r_S$, which may be stored in its memory M and used as needed in the execution of method 100.

As part of its overall shift control functions, the controller 50 may also receive or determine an output torque request ($T_{REQ}$). The output torque request ($T_{REQ}$) is largely determined by the actions of an operator (e.g., driver) of the vehicle 10, for instance via a throttle request, braking levels, present gear state, and the like. To this end, the vehicle 10 includes an operator actuator 35, such as an accelerator pedal, configured to receive inputs from the driver. In the depicted embodiment, the operator actuator 35 can represent the accelerator pedal, the brake pedal, a combination thereof, or any other suitable actuator capable of communicating the output torque request $T_{REQ}$ to the controller 50. Accordingly, the controller 50 is in communication (e.g., electronic communication) with the operator actuator 35 and can determine the need for a speed ratio change of the CVT 14 in response to the collective control inputs ($CC_I$) and commands a required clamping force (arrow $F_C$) via transmission of actuator control signals (arrow $F_{CC}$) to achieve the desired ratio change at a calibrated rate.

As part of this strategy, the controller 50 ultimately adjusts the primary and/or secondary forces ($F_P$ and $F_S$) to the actuators 28 and 30 to control a transition between friction drive and positive engagement drive as explained below with reference to FIG. 5. In some embodiments, the actuator control signals ($F_{cc}$) may include a separate positive engagement control signal ($P_A$), for instance when the endless rotatable device 22 or another portion of the CVT 14 is equipped with moveable or deployable teeth or other mechanisms that are commanded on so as to positively engage the CVT 14 and thus enter a fixed gear mode.

A CVT assembly 40 including the CVT 14 and controller 50 of FIG. 1 are shown in more detail in FIG. 2. In this particular non-limiting example embodiment, the CVT 14 provides fixed gear/positive engagement functionality via direct engagement of its device teeth 22T with the pulley teeth 19T and 21T of the respective pulley sheaves 19 and 21. The device teeth 22T selectively engage (e.g., mate with) the pulley teeth 19T and/or 21T at or near the limits of motion of the sheaves 191 and 121 to thereby achieve a fixed gear ratio.

The pulley teeth 19T and 21T are annularly arranged on the respective sheave faces 23 and 25, for instance circumscribing an axis of rotation 11P, 11S of respective pulley shafts 60 and 62 of the primary and secondary pulleys 18 and 20. Positive engagement occurs between the pulley teeth 19T or 21T and the device teeth 22T when the rotating endless rotatable device 22 is brought into proximity with the pulley teeth 19T or 21T during a movement of the moveable pulley sheaves 191 and/or 121, such that the device teeth 22T ultimately contact and then engage the pulley teeth 19T and/or 21T. This positive engagement establishes a fixed gear mode.

The endless rotatable device 22 has a longitudinal center axis 31 as shown. The device teeth 22T may be arranged orthogonally with respect to the longitudinal center axis 31 of the endless rotatable device 22 to extend radially from a lateral edge of the endless rotatable device 22 toward the pulley teeth 19T, 21T. Although omitted from FIG. 2 for illustrative clarity, similar teeth could be provided on the pulley axles 60 and 62, and/or some teeth may be selectively moveable in response to the positive engagement control signals ($P_A$) of FIG. 1. With respect to the control method 100, the particular design of the CVT 14 is not limiting, provided that the CVT 14 is operable to establish both friction drive and positive engagement modes.

With respect to the example CVT 14 shown in FIGS. 1 and 2, during some speed ratios the pulley teeth 19T and 21T do not engage with the device teeth 22T. When not positively engaged, the speed ratios are infinitely variable, with torque transmitted solely via friction between the endless rotatable device 22 and the primary and secondary pulleys 18 and 20. As the device teeth 22T come into direct contact with the pulley teeth 19T or 21T, the controller 50 can control the clamping force $F_C$ exerted by the actuators 29 and/or 30 on the drive pulley 18 and/or the driven pulley 20 based, at least in part, on various signals from the sensors 29 (FIG. 1).

With reference to FIGS. 3 and 4, when the CVT 14 operates in the friction drive mode, at least some of the device teeth 22T are in direct contact with the pulley teeth 19T and/or 22T. During operation, the drive pulley 18 and the driven pulley 20 rotate about their respect axes of rotation 11P, 11S in a first torque direction R1. In response to a torque request $T_{REQ}$, the controller 50 may command the CVT 14 to change the torque direction of the drive pulley 18 and the driven pulley 20 from the first torque direction R1 to a second torque direction R2 (which is opposite to the first torque direction R1). In other words, the torque request $T_{REQ}$ may entail a torque direction reversal request. For example, when the vehicle operator performs a tip-out operation, the controller 50 may command the CVT 14 to change the direction of its input torque. In the present disclosure, the term "tip-out operation" refers to an operation in which the vehicle operator releases an accelerator pedal. During the torque direction reversal and while the CVT 14 operates in the fixed gear/positive engagement mode, the endless rotatable device 22 may need to travel a predetermined distance in order to allow the device teeth 22T to engage (e.g., mate with) the pulley teeth 19T and 21T because of a lash L between the pulley teeth 19T and 21T and the device teeth 22T. In the present disclosure, the term "lash" means the amount of free motion between two components (e.g., gear teeth). The "lash" can be measured in terms of the distance between two components. In the depicted embodiment, the lash L is shown as the distance between one of the device teeth 22T and one of the pulley teeth 21T. Because of the lash L between the device teeth 22T and the pulley teeth 19T and 21T, the CVT 14 may experience a lash-induced impact during the torque direction reversal.

The present method 100 and controller 50 together operate to minimize the lash-induced impact when the torque direction of the CVT 14 is reversed (i.e., during a torque direction reversal). The controller 50 is specifically programmed to minimize the lash-induced impact on the CVT 14 when the torque direction is reversed (i.e., during a torque reversal).

Figure 5:
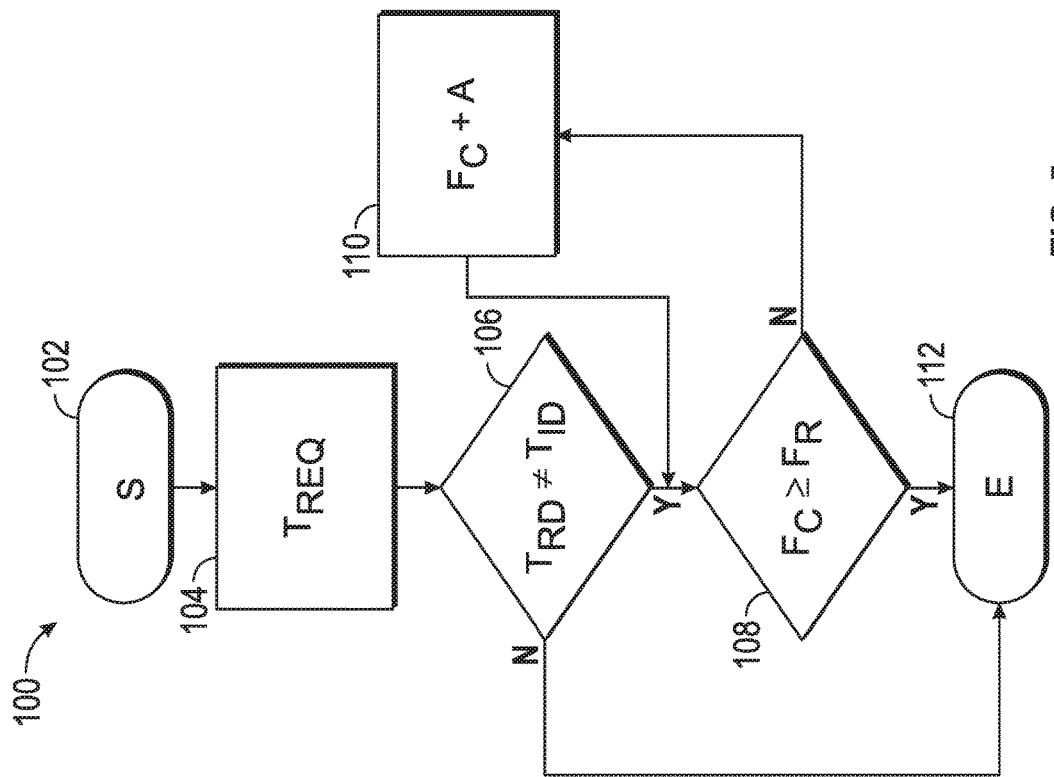
FIG. 5 is a flow chart describing a method for controlling the CVT shown in FIG. 2.

FIG. 5 is a flowchart of a method 100 for controlling the CVT 14. The general steps of method 100 can also be performed with alternative designs having similar functionality, and therefore the method 100 is not limited to use with the particular CVT 14 described above. Intended benefits of the automatic execution of the method 100 aboard the vehicle 10 via the controller 50 include the achievement of a smoother transition during a transmission torque reversal, improved drivability, reduced noise, vibration, and harshness, and extended component life.

The method 100 begins at step 102 (i.e., start block S). Then, the method 100 continues to step 104, in which the controller 50 receives or determines an output torque request $T_{REQ}$. The output torque request $T_{REQ}$ is at least partly based on the actions of a driver of the vehicle 10, such as a throttle request, braking levels, present gear state, and the like. In step 104, the controller 50 may receive the output torque request $T_{REQ}$ from a control unit, such as an engine control unit or a powertrain control unit. Alternatively, the controller 50 may determine the output torque $T_{REQ}$ itself based at least partly on conditions of the driver actuator (e.g., accelerator pedal or brake pedal). To achieve the output torque request $T_{REQ}$, the input member 130 of the CVT 14 must transmit certain input torque. Accordingly, the output torque request $T_{REQ}$ necessarily includes a torque request magnitude $T_{RM}$ and a torque request direction $T_{RD}$. In the present disclosure, the term "torque request magnitude" means the magnitude of the input torque of the CVT 14 necessary to achieve the output torque request $T_{REQ}$. The term "torque request direction" means the direction of the input torque of the CVT 14 necessary to achieve the output torque request $T_{REQ}$. Accordingly, in step 104, the controller 50 receives or determines the torque request magnitude $T_{RM}$ and the torque request direction $T_{RD}$ based at least in part on an input signal from the operator actuator 35. After receiving (or otherwise determining) the output torque request $T_{REQ}$, the method 100 proceeds to step 106.

In step 106, the controller 50 determines whether the torque request direction $T_{RD}$ is opposite to the current input torque direction $T_{ID}$. Specifically, the controller 50 compares the torque request direction $T_{RD}$ with the current input torque direction $T_{ID}$ of the CVT 14. In the present disclosure, the term "current input torque direction" means the direction of the input torque of the drive pulley 18 during and/or before the controller 50 receives or determines the output torque request $T_{REQ}$. As discussed above, the controller 50 can determine the current torque direction $T_{ID}$ based on input from the torque sensor $S_T$. Alternatively, the controller 50 can determine the input torque magnitude $T_{IM}$ and the current input torque direction $T_{ID}$ based, at least in part, on an input from the speed sensors $S_P$. It is also contemplated that the controller 50 may determine the current input torque direction $T_{ID}$ based on inputs from other controllers, such as an engine control unit or a powertrain control unit. Regardless of how the input torque direction $T_{ID}$ is determined, the controller 50 compares the current input torque direction $T_{ID}$ and the torque request direction $T_{RD}$ to determine whether the current input torque direction $T_{ID}$ is opposite to the torque request direction $T_{RD}$. In other words, the controller 50 determines whether the output torque request $T_{REQ}$ requires a torque direction reversal in the CVT 14. If a torque direction reversal is not required, the method 100 proceeds to step 112 (i.e., end block E). In step 112, the method 100 ends.

If the current input torque direction $T_{ID}$ is opposite to the torque request direction $T_{RD}$, then the method 100 proceeds to step 108. In other words, if the output torque request $T_{REQ}$ requires a torque direction reversal in the CVT 14, then the method 100 continues to step 108.

In step 108, the controller 50 determines whether the clamping force $F_C$ applied by the actuators 28 and/or 30 to the drive pulley 18 is sufficient to change the direction of the torque transmitted by the drive pulley 18 from the input torque direction $T_{ID}$ to the torque request direction $T_{RD}$ when the torque request direction $T_{RD}$ is opposite to the current input torque direction $T_{ID}$. In other words, the controller 50 determines whether the CVT 14 can reverse the torque direction of the drive pulley 18 while operating in the friction drive mode or the fixed gear/positive engagement mode. In step 108, the controller 50 compares the current clamping force $F_C$ applied to the drive pulley 18 with a predetermined clamping force $F_R$. The predetermined clamping force $F_R$ may be a predetermined, calibrated clamping force stored on the memory (M) in a calibration look-up table. The calibration look-up table used to determine the predetermined clamping force $F_R$ changes depending on whether the CVT 14 is operation in the friction drive mode or the fixed gear/positive engagement mode. Therefore, before determining the predetermined clamping force $F_R$, the controller 50 determines whether the CVT 14 is operating in the friction drive mode or the fixed gear/positive engagement mode. The controller 50 can access the memory (M) to retrieve the predetermined clamping force $F_R$. If the current clamping force $F_C$ is equal or greater than the predetermined, calibrated clamping force $F_R$, then the controller 50 determines that the clamping force $F_C$ applied to the drive pulley 18 is sufficient to change the torque direction of the drive pulley 18 from the input torque direction $T_{ID}$ to the torque request direction $T_{RD}$. Alternatively, the controller 50 can calculate the predetermined clamping force $F_R$, if the CVT 14 is operating in the friction drive mode, and can then compare the current clamping force $F_C$ applied to the drive pulley 18 with the predetermined, calculated clamping force $F_R$. The controller 50 can calculate the predetermined clamping force $F_R$ using, for example, the following mathematical equation.

$$F_R = \frac{T_{RM} \times \cos(\alpha)}{2\mu R_P} \times (S.F.)$$

wherein:

$F_R$ is the predetermined, calculated clamping force;

$T_{RM}$ is the torque request magnitude;

α is the sheave angle, which is an oblique angle defined between the sheave face 23 and the circumferential edge 44 (see FIG. 4);

μ is the coefficient of friction between the sheave face 23 and the endless rotatable device 22;

$R_P$ is the radius of the drive pulley 18; and

S.F. is a safety factor, which is equal to or greater than one (1).

Therefore, the predetermined clamping force $F_R$ is based, at least in part, on the torque request magnitude $T_{RM}$, the coefficient of friction μ between the between the sheave face 23 and the endless rotatable device 22, the radius $R_P$ is the of the drive pulley 18, or a combination thereof. The controller 50 can calculate the predetermined clamping force $F_R$ using another equation if the CVT 14 is operating in the fixed gear/positive engagement mode.

Alternatively, in step 108, the controller 50 can determine whether the current input torque direction $T_{ID}$ of the CVT 14 has changed from the original input torque direction to the torque request direction $T_{RD}$ after a predetermined amount of time has passed since the controller 50 received the torque request $T_{REQ}$. To do so, the controller 50 can determine the current input torque direction based, at least in part, on inputs from the sensors 29, such as the torque sensor $S_T$ and/or speed sensors $S_P$ and $S_S$.

If the current clamping force $F_C$ is equal to or greater than the predetermined, calculated clamping force $F_R$, then the controller 50 determines that the clamping force $F_C$ currently applied to the drive pulley 18 is sufficient to change the torque direction of the drive pulley 18 from the input torque direction $T_M$ to the torque request direction $T_{RD}$.

If the clamping force $F_C$ applied to the drive pulley 18 is sufficient to change the torque direction of the drive pulley 18 from the input torque direction to the torque request direction $T_{RD}$, then the method 100 proceeds to step 112 (i.e., end block E). As discussed above, in step 112, the method 100 ends.

If the current clamping force $F_C$ applied to the drive pulley 18 is not sufficient to change the torque direction of the drive pulley 18 from the input torque direction $T_{ID}$ to the torque request direction $T_{RD}$, then the method 100 continues to step 110.

In step 110, the controller 50 commands the actuators 28 and/or 30 to increase the current clamping force $F_C$ applied to the drive pulley 18 by a predetermined amount A. This predetermined amount A may be stored in a calibration look-up table stored on the memory (M). Alternatively, the controller 50 can calculate the predetermined amount A. The predetermined amount A may be based, at least in part, on the predetermined clamping force $F_R$. For example, the controller 50 can subtract the current clamping force $F_C$ from the predetermined clamping force $F_R$ in order to determine the difference between the current clamping force $F_C$ from the predetermined clamping force $F_R$. Accordingly, the predetermined amount A may be equal to the difference between the current clamping force $F_C$ and the predetermined clamping force $F_R$. In response to the command from the controller 50, the actuators 28 and/or 30 increase the clamping force $F_C$ applied to the drive pulley 18 by the predetermined amount A. Next, the method 100 returns to step 108. As discussed above, at step 108, the controller 50 determines whether the current clamping force $F_C$ applied by the actuators 28 and/or 30 to drive pulley 18 is sufficient to change the torque direction of the drive pulley 18 from the input torque direction $T_{ID}$ to the torque request direction $T_{RD}$.

While the best modes for carrying out the disclosure have been described in detail, those familiar with the art to which this disclosure relates will recognize various alternative designs and embodiments within the scope of the appended claims. Although the steps of the method 100 are described in a particular chronological order, it is contemplated that the steps of the method 100 may be executed in another chronological order.

The invention claimed is:

1. A method for controlling a continuously variable transmission (CVT), wherein the CVT includes a drive pulley, a driven pulley, and an endless rotatable device coupled between the drive pulley and the driven pulley, the drive pulley and the driven pulley each including pulley teeth, and the endless rotatable device including device teeth, wherein the method comprises:

receiving, via a controller, a torque request while the drive pulley of the CVT transmits torque in an input torque direction and the device teeth are mating with the pulley teeth, wherein the torque request includes a torque request magnitude and a torque request direction;

determining, via the controller, whether the torque request direction is opposite to the input torque direction;

determining, via the controller, whether a current clamping force applied by an actuator to the drive pulley is sufficient to change a direction of a torque transmitted by the drive pulley from the input torque direction to the torque request direction when the torque request direction is opposite to the input torque direction; and commanding, via the controller, the actuator to increase the current clamping force applied to the drive pulley when the current clamping force is not sufficient to change the direction of the torque transmitted by the drive pulley from the input torque direction to the torque request direction.

2. The method of claim 1, wherein determining whether the current clamping force applied by the actuator to the drive pulley is sufficient to change the direction of the torque transmitted by the drive pulley includes comparing the current clamping force applied by the actuator to the drive pulley to a predetermined clamping force in order to determine if the current clamping force is greater than or equal to the predetermined clamping force.

3. The method of claim 2, wherein the predetermined clamping force is based, at least in part, on the torque request magnitude.

4. The method of claim 3, wherein the drive pulley has a sheave face, and the predetermined clamping force is based, at least in part, on a coefficient of friction between the sheave face and the endless rotatable device.

5. The method of claim 4, wherein the drive pulley has a radius, and the predetermined clamping force is based, at least in part, on the radius of the drive pulley.

6. The method of claim 2, wherein commanding the actuator to increase the current clamping force applied to the drive pulley includes commanding the actuator to increase the clamping force by a predetermined amount, and the predetermined amount is based, at least in part, on the predetermined clamping force.

7. The method of claim 6, wherein the predetermined amount is equal to a difference between the current clamping force and the predetermined clamping force.

8. A continuously variable transmission (CVT) assembly, comprising:
   a CVT including a drive pulley, a driven pulley, and an endless rotatable device coupled between the drive pulley and the driven pulley, the drive pulley and the driven pulley each including pulley teeth, and the endless rotatable device including device teeth configured to mate with the pulley teeth;
   an actuator operatively coupled to the drive pulley such that the actuator is configured to exert a current clamping force on the drive pulley;
   a controller programmed to:
      receive a torque request while the drive pulley of the CVT transmits torque in an input torque direction, wherein the torque request includes a torque request magnitude and a torque request direction;
      determine whether the torque request direction is opposite to the input torque direction;
      determine whether the current clamping force applied by the actuator to the drive pulley is sufficient to change a direction of a torque transmitted by the drive pulley from the input torque direction to the torque request direction when the torque request direction is opposite to the input torque direction; and
      command the actuator to increase the current clamping force applied to the drive pulley when the current clamping force is not sufficient to change the direction of the torque transmitted by the drive pulley from the input torque direction to the torque request direction.

9. The CVT assembly of claim 8, wherein the controller is programmed to compare the current clamping force applied by the actuator to the drive pulley to a predetermined clamping force in order to determine whether the current clamping force applied by the actuator to the drive pulley is sufficient to change the direction of the torque transmitted by the drive pulley from the input torque direction to the torque request direction.

10. The CVT assembly of claim 9, wherein the predetermined clamping force is based, at least in part, on the torque request magnitude.

11. The CVT assembly of claim 10, wherein the drive pulley has a sheave face, and the predetermined clamping force is based, at least in part, on a coefficient of friction between the sheave face and the endless rotatable device.

12. The CVT assembly of claim 11, wherein the drive pulley has a radius, and the predetermined clamping force is based, at least in part, on the radius of the drive pulley.

13. The CVT assembly of claim 9, wherein the controller is programmed to command the actuator to increase the current clamping force by a predetermined amount, and the predetermined amount is based, at least in part, on the predetermined clamping force.

14. The CVT assembly of claim 13, wherein the predetermined amount is equal to a difference between the current clamping force and the predetermined clamping force.

15. A vehicle, comprising:
   a power plant configured to generate input torque;
   a CVT including a drive pulley, a driven pulley, and an endless rotatable device coupled between the drive pulley and the driven pulley, wherein the drive pulley is coupled to the power plant such that the drive pulley is configured to receive the input torque from the power plant;
   an actuator operatively coupled to the drive pulley such that the actuator is configured to exert a current clamping force on the drive pulley;
   a controller specifically programmed to:
      receive a torque request while the drive pulley of the CVT transmits torque in an input torque direction, wherein the torque request includes a torque request magnitude and a torque request direction;
      determine whether the torque request direction is opposite to the input torque direction;
      determine whether the current clamping force applied by the actuator to the drive pulley is sufficient to change a direction of a torque transmitted by the drive pulley from the input torque direction to the torque request direction when the torque request direction is opposite to the input torque direction; and
      command the actuator to increase the current clamping force applied to the drive pulley when the current clamping force is not sufficient to change the direction of the torque transmitted by the drive pulley from the input torque direction to the torque request direction.

16. The vehicle of claim 15, wherein the controller is programmed to compare the current clamping force applied by the actuator to the drive pulley to a predetermined clamping force in order to determine whether the current clamping force applied by the actuator to the drive pulley is sufficient to change the direction of the torque transmitted by the drive pulley from the input torque direction to the torque request direction.

17. The vehicle of claim 16, wherein the predetermined clamping force is based, at least in part, on the torque request magnitude.

18. The vehicle of claim 17, wherein the drive pulley has a sheave face, and the predetermined clamping force is based, at least in part, on a coefficient of friction between the sheave face and the endless rotatable device.

19. The vehicle of claim 18, wherein the drive pulley has a radius, and the predetermined clamping force is based, at least in part, on the radius of the drive pulley.

20. The vehicle of claim 19, wherein the controller is programmed to command the actuator to increase the current clamping force by a predetermined amount, and the predetermined amount is based, at least in part, on the predetermined clamping force.

* * * * *